(12) United States Patent
Tang (10) Patent No.: US 11,038,564 B2
(45) Date of Patent: Jun. 15, 2021

(54) METHOD AND DEVICE FOR TRANSMITTING DATA

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/483,701

(22) PCT Filed: Feb. 7, 2017

(86) PCT No.: PCT/CN2017/073061
§ 371 (c)(1),
(2) Date: Aug. 5, 2019

(87) PCT Pub. No.: WO2018/145247
PCT Pub. Date: Aug. 16, 2018

(65) Prior Publication Data
US 2020/0021340 A1    Jan. 16, 2020

(51) Int. Cl.
*H04W 52/48*    (2009.01)
*H04B 7/0456*    (2017.01)
*H04B 7/06*    (2006.01)
*H04W 72/12*    (2009.01)

(52) U.S. Cl.
CPC ......... *H04B 7/0456* (2013.01); *H04B 7/0695* (2013.01); *H04W 52/48* (2013.01); *H04W 72/1268* (2013.01)

(58) Field of Classification Search
CPC ...... H04B 7/0456; H04B 7/0695; H04B 1/74; H04B 7/08; H04W 52/48; H04W 72/1268; H04L 1/189; H04L 1/1887; H04L 1/1893
See application file for complete search history.

(56) References Cited

U.S. PATENT DOCUMENTS

| | | | | |
|---|---|---|---|---|
| 8,407,547 B2* | 3/2013 | Kim | ...................... | H04L 1/0618 |
| | | | | 714/748 |
| 9,743,423 B2* | 8/2017 | Liu | ...................... | H04L 1/0003 |
| 9,781,744 B1* | 10/2017 | Tenny | ...................... | H04W 72/12 |

(Continued)

FOREIGN PATENT DOCUMENTS

| | | |
|---|---|---|
| CN | 103931258 | 7/2014 |
| EP | 2048807 | 4/2009 |

(Continued)

OTHER PUBLICATIONS

WIPO, ISR for PCT/CN2017/073061, Nov. 15, 2017.

(Continued)

*Primary Examiner* — Kenneth T Lam
(74) *Attorney, Agent, or Firm* — Hodgson Russ LLP (57) ABSTRACT

A method for transmitting data includes: sending, by a first device using a first transmission mode, first data to a second device, the first data being autonomously sent by the first device; and performing, by the first device using a second transmission mode, retransmission of all or part of the first data, the second transmission mode being different from the first transmission mode.

18 Claims, 2 Drawing Sheets

(56) References Cited

U.S. PATENT DOCUMENTS

| | | | | |
|---|---|---|---|---|
| 2009/0098876 | A1* | 4/2009 | Khan | H04B 7/0456 |
| | | | | 455/445 |
| 2010/0316096 | A1* | 12/2010 | Adjakple | H04L 1/1887 |
| | | | | 375/211 |
| 2011/0038352 | A1* | 2/2011 | Bergman | H04L 1/1822 |
| | | | | 370/331 |
| 2011/0116448 | A1* | 5/2011 | Jongren | H04L 1/1893 |
| | | | | 370/328 |
| 2011/0235586 | A1* | 9/2011 | Han | H04B 7/0426 |
| | | | | 370/328 |
| 2012/0076078 | A1* | 3/2012 | Han | H04L 5/0048 |
| | | | | 370/328 |
| 2012/0082259 | A1* | 4/2012 | Yue | H04L 25/03343 |
| | | | | 375/285 |
| 2017/0367110 | A1* | 12/2017 | Li | H04W 4/70 |
| 2018/0124816 | A1* | 5/2018 | Han | H04W 72/0493 |
| 2018/0199359 | A1* | 7/2018 | Cao | H04W 28/04 |
| 2018/0206262 | A1* | 7/2018 | Cao | H04W 72/1268 |
| 2018/0337752 | A1* | 11/2018 | Choi | H04B 7/26 |
| 2019/0166609 | A1* | 5/2019 | Xu | H04W 72/1268 |
| 2019/0174513 | A1* | 6/2019 | Loehr | H04W 72/1242 |
| 2019/0223203 | A1* | 7/2019 | Zhang | H04L 5/0048 |
| 2019/0379491 | A1* | 12/2019 | Kilinc | H04L 1/1858 |

FOREIGN PATENT DOCUMENTS

| | | |
|---|---|---|
| EP | 2587704 | 5/2013 |
| RU | 2590902 | 7/2016 |
| WO | 2004015887 | 2/2004 |
| WO | 2005084058 | 9/2005 |
| WO | 2014111468 | 7/2014 |
| WO | 2016073616 | 5/2016 |

OTHER PUBLICATIONS

Intel Corporation, "Support of link adaptation for UL grant-free NOMA schemes," 3GPP TSG-RAN WG1 #86bis, R1-1610374, Oct. 2016, 4 pages.

Intel Corporation, "Grant-less and non-orthogonal UL transmissions in NR," 3GPP TSG-RAN WG1 #86, R1-167698, Aug. 2016, 5 pages.

ZTE, "Discussion on grant-free transmission for URLLC," 3GPP TSG RAN WG1 Meeting #87, R1-1611296, Nov. 2016, 7 pages.

EPO, Office Action for EP Application No. 17896033, 2, dated Jan. 24, 2020.

FSIP, Office Action for RU Application No. 2019127913, dated Mar. 12, 2020.

SIPO, First Office Action for CN Application No. 201780081208.2, dated May 12, 2020.

IPOS, Office Action for SG Application No. 11201907270W, dated Sep. 1, 2020.

IPI, Office Action for IN Application No. 201917035523, dated Nov. 24, 2020.

EPO, Communication for EP Application No. 17896033.2, dated Nov. 11, 2020.

ISDEC, Office Action for CA Application No. 3052899, dated Oct. 8, 2020.

* cited by examiner

First device uses first transmission means to send first data to second device, first data being data sent autonomously by first device — S210

First device uses second transmission means to retransmit first data in full or in part, first transmission means being different from second transmission means — S220

METHOD AND DEVICE FOR TRANSMITTING DATA

CROSS-REFERENCE TO RELATED APPLICATION

This application is a U.S. national phase application of International Application No. PCT/CN2017/073061, filed Feb. 7, 2017, the entire disclosure of which is incorporated herein by reference.

TECHNICAL FIELD

The present application relates to the field of communications and, more particularly, to a method and a device for transmitting data.

BACKGROUND

An uplink data transmission mode based on grant-free is introduced in the 5G system, and the terminal device is able to initiate uplink data transmission without requiring scheduling signaling of the network device. However, the transmission mode used by the terminal device to transmit data may not match the current uplink channel condition, so that it is difficult to achieve a large transmission gain, resulting in low transmission reliability. Therefore, a method is needed to improve transmission reliability at the time of retransmission.

SUMMARY

Embodiments of the present disclosure provide a method and a device for transmitting data, which can improve transmission reliability at the time of retransmission.

According to a first aspect, there is provided a method for transmitting data, including: sending, by a first device using a first transmission mode, first data to a second device, the first data being autonomously sent by the first device; and performing, by the first device using a second transmission mode, retransmission of all or part of the first data, the second transmission mode being different from the first transmission mode.

According to some implementation manners of the first aspect, in combination with the first aspect, the first data autonomously sent by the first device is sent by the first device without receiving a scheduling grant from another device.

According to some implementation manners of the first aspect, in combination with the first aspect, the sending, by a first device using a first transmission mode, first data to a second device includes:

sending, by the first device using a first multiple input multiple output (MIMO) transmission mode, the first data to the second device;

the performing, by the first device using a second transmission mode, retransmission of all or part of the first data includes:

performing, by the first device using a second MIMO transmission mode, the retransmission of all or part of the first data, the second MIMO transmission mode being different from the first MIMO transmission mode.

According to some implementation manners of the first aspect, in combination with the first aspect, the sending, by a first device using a first transmission mode, first data to a second device includes:

sending, by the first device using a first antenna port, the first data to the second device; the performing, by the first device using a second transmission mode, retransmission of all or part of the first data includes:

performing, by the first device using a second antenna port, the retransmission of all or part of the first data, the second antenna port being different from the first antenna port.

According to some implementation manners of the first aspect, in combination with the first aspect, the sending, by a first device using a first transmission mode, first data to a second device includes:

sending, by the first device using a first precoding matrix, the first data to the second device;

the performing, by the first device using a second transmission mode, retransmission of all or part of the first data includes:

performing, by the first device using a second precoding matrix, the retransmission of all or part of the first data, the second precoding matrix being different from the first precoding matrix.

According to some implementation manners of the first aspect, in combination with the first aspect, the method further includes:

acquiring, by the first device using a cycling manner, a precoding matrix used for each transmission of all or part of the first data from a preconfigured precoding matrix set.

According to some implementation manners of the first aspect, in combination with the first aspect, the sending, by a first device using a first transmission mode, first data to a second device includes:

sending, by the first device using a first number of transmission layer, the first data to the second device;

the performing, by the first device using a second transmission mode, retransmission of all or part of the first data includes:

performing, by the first device using a second number of transmission layer, the retransmission of all or part of the first data, the second number of transmission layer being different from the first number of transmission layer.

According to some implementation manners of the first aspect, in combination with the first aspect, the sending, by a first device using a first transmission mode, first data to a second device includes:

sending, by the first device using a first beam, the first data to the second device; the performing, by the first device using a second transmission mode, retransmission of all or part of the first data includes:

performing, by the first device using a second beam, the retransmission of all or part of the first data, the second beam being different from the first beam.

According to some implementation manners of the first aspect, in combination with the first aspect, the sending, by a first device using a first transmission mode, first data to a second device includes:

sending, by the first device using a first transmission power, the first data to the second device;

the performing, by the first device using a second transmission mode, retransmission of all or part of the first data includes:

performing, by the first device using a second transmission power, the retransmission of all or part of the first data, the second transmission power being different from the first transmission power.

According to some implementation manners of the first aspect, in combination with the first aspect, the performing, by the first device using a second transmission mode, retransmission of all or part of the first data includes:

performing, by the first device, the retransmission of all or part of the first data when there is no scheduling grant or acknowledgment/negative-acknowledgement (ACK/NACK) indication being received from the second device after sending the first data to the second device.

According to some implementation manners of the first aspect, in combination with the first aspect, when the first device performs retransmission of all or part of the first data for multiple times, different transmission modes are used for each time of the retransmission of all or part of the first data.

According to some implementation manners of the first aspect, in combination with the first aspect, a transmission mode used by the first device for initial transmission or retransmission of the first data is pre-configured by the second device for the first device, or predetermined by the first device and the second device, or determined by the first device.

According to some implementation manners of the first aspect, in combination with the first aspect, the method further includes:

determining, by the first device, a resource pool used for transmitting the first data according to a transmission mode used for transmitting the first data and a correspondence, the correspondence being indicative of corresponding relation between multiple transmission modes used for transmitting the first data and multiple resource pools.

According to some implementation manners of the first aspect, in combination with the first aspect, the method further includes:

determining, by the first device, a transmission mode used for transmitting the first data according to a resource pool used for transmitting the first data and a correspondence, the correspondence being indicative of corresponding relation between multiple transmission modes used for transmitting the first data and multiple resource pools.

According to some implementation manners of the first aspect, in combination with the first aspect, the first device is a terminal device, the second device is a network device; or, the first device is a terminal device, the second device is a terminal device.

According to a second aspect, there is provided a device for transmitting data, including a unit(s) for implementing the method according to the first aspect or various implementation manners thereof.

According to a third aspect, there is provided a device for transmitting data, including: a memory, a processor and a transceiver, the memory is configured to store a program, the processor is configured to execute the program and, when the program is executed, implement the method according to the first aspect based on the transceiver.

According to a fourth aspect, there is provided a computer readable medium, which stores a program code for execution by a terminal device, the program code including instructions for performing the method according to the first aspect.

DETAILED DESCRIPTION

Technical solutions in the embodiments of the present disclosure will be described below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, or a future 5G system, etc.

Figure 1:
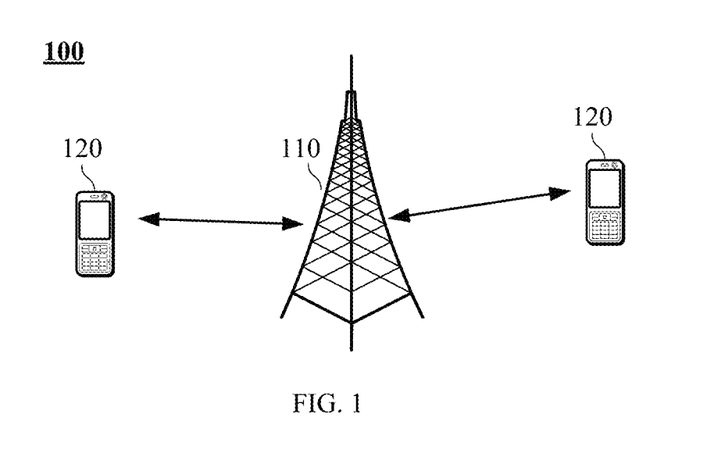
FIG. 1 is a schematic diagram illustrating a communication system in accordance with an embodiment of the present application.

FIG. 1 illustrates a wireless communication system 100 where an embodiment of the present disclosure is applied. The wireless communication system 100 may include a network device 110. The network device 110 may be a device communicating with a terminal device. The network device 110 may provide communication coverage for a particular geographic region, and may communicate with a terminal device (such as UE) positioned within the coverage region. Optionally, the network device 110 may be a Base Transceiver Station (BTS) in a GSM system or a CDMA system, a NodeB (NB) in a WCDMA system, an Evolutional Node B (eNB or eNodeB) in a LTE system, an LTE Time Division Duplex (TDD) system, or a wireless controller in Cloud Radio Access Network (CRAN), or a relay station, an access point, a vehicle-mounted device, a wearable device, a network side device in a future 5G network, or a network device in a future evolutional Public Land Mobile Network (PLMN).

The wireless communication system 100 further includes at least one terminal device 120 positioned within the coverage range of the network device 110. The terminal device 120 may be either mobile or fixed. Optionally, the terminal device 120 may refer to an access terminal, user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, an SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in the future 5G network, or a terminal device in the future evolutional PLMN, etc.

Optionally, a device to device (D2D) communication may be performed between the terminal devices 120.

Optionally, the 5G system or network may also be referred to as a new radio (NR) system or network.

FIG. 1 exemplarily shows one network device and two terminal devices. Optionally, the wireless communication system 100 may include a plurality of network devices and may include another number of terminal devices within the coverage of each network device. Embodiments of the application are not limited thereto.

In the wireless communication system 100, the terminal device may use a grant-free uplink data transmission mode (or may also be referred to as an autonomous uplink transmission mode) to transmit data to another terminal device or the network device. With the grant-free uplink transmission mode, the terminal device can send data to another terminal device or the network device autonomously without receiving scheduling grants of other devices.

Optionally, the wireless communication system 100 may further include other network entities, such as a network controller, a mobility management entity, and the like.

It should be understood that the terms "system" and "network" are used interchangeably herein. The term "and/or" in this context is merely an association describing the associated object, indicating that there may be three relationships. For example, "A and/or B" may indicate these three situations: A exists separately, both A and B exist respectively, or B exists separately. In addition, the character "/" in this article generally indicates that the contextual object is in an "or" relationship.

Figure 2:
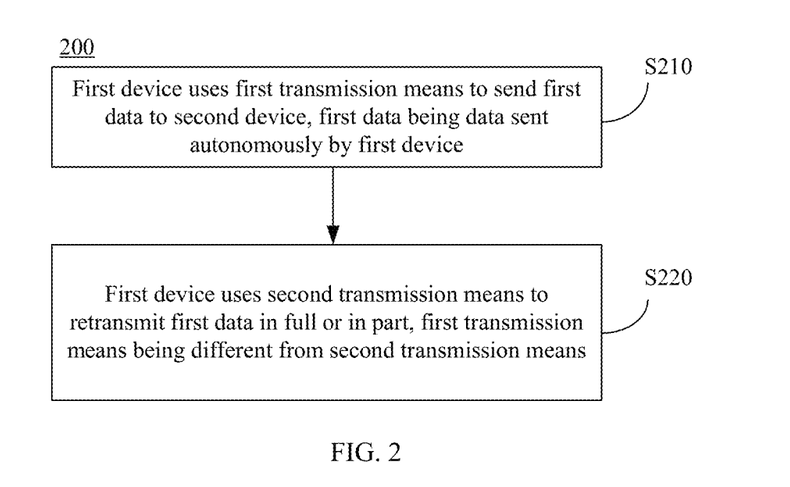
FIG. 2 is a schematic flowchart illustrating a method for transmitting data according to an embodiment of the present application.

FIG. 2 is a schematic flowchart illustrating a method 200 for transmitting data according to an embodiment of the present application. As shown in FIG. 2, the method 200 includes following steps.

In step S210, the first device sends the first data to the second device by using a first transmission mode, the first data being autonomously sent by the first device.

In an embodiment, the first device may be a terminal device in the wireless communication system shown in FIG. 1, and the second device may be the network device or a terminal device in the wireless communication system shown in FIG. 1.

Specifically, the first device may send the first data to the second device, the first data being autonomously sent by the first device, it may be understood as that the first data is sent by the first device based on the grant-free uplink transmission mode.

Optionally, the first data autonomously sent by the first device is sent without receiving a scheduling grant from another device. In an embodiment, the another device may be a network device or another terminal device. That is, the first data may be sent by the terminal device to the network device, or may be sent by the terminal device to the another terminal device. For example, the first data may relate to a grant-free uplink transmission performed by the terminal device that is not based on a uplink grant (UL grant) of a network device.

Optionally, the first device uses the first transmission mode to transmit the first data may refer to that the first device transmits the first data by using a first multiple-input multiple-output (MIMO) transmission mode, a first antenna port, a first precoding matrix, a first beam, or a first transmission power. Embodiments of the application are not limited thereto. In an embodiment, the MIMO transmission mode may specifically refer to MIMO technology used for signal transmission. For example, the MIMO transmission mode may include transmission diversity, codebook based precoding, non-codebook based precoding, single antenna port transmission, beamforming and the like.

It should be understood that the sending, by the first device, the first data to the second device may refer to that the first device transmits the first data for the first time, or the first device retransmits the first data. In other words, step S210 may include an initial transmission of the first data, or one of multiple retransmissions of the first data.

In step S220, the first device performs retransmission of all or part of the first data by using a second transmission mode, the second transmission mode being different from the first transmission mode.

Specifically, in an embodiment, if the first device transmits the first data by using the first transmission mode and the transmission fails, the first device may retransmit the first data by using the second transmission mode. In another embodiment, the first device may transmit the first data multiple times by using different transmission modes, regardless of whether the previous transmission fails. The difference between the first transmission mode and the second transmission mode may refer to different MIMO transmission modes, different antenna ports, different precoding matrices, different beams, or different transmission powers.

It should be understood that the (k+1)-th transmission of the first data may include part or all of the first data in the k-th transmission. In other words, a current transmission may include part or all of the data in the previous transmission.

Optionally, the first device may perform the retransmission of all or part of the first data when there is no scheduling grant or acknowledgment/negative-acknowledgement (ACK/NACK) indication being received from the second device after sending the first data to the second device.

In other words, the retransmission of all or part of the first data may be performed by the first device when there is no scheduling grant being received from the second device, or when there is no ACK/NACK indication being received from the second device, that is, the first device does not know whether the previous transmission successes. Optionally, the first device may also perform retransmission of all or part of the first data upon receiving a NACK indication from the second device.

Optionally, in an embodiment, the step S210 may include:
the first device sends the first data to the second device by using a first MIMO transmission mode.

In this embodiment, the step S220 may include:
the first device performs retransmission of all or part of the first data by using a second MIMO transmission mode, the second MIMO transmission mode being different from the first MIMO transmission mode.

Specifically, the first device may transmit the first data multiple times by using different transmission modes. For example, the first device may send the first data to the second device by using the first MIMO transmission mode, and the first MIMO transmission mode may refer to a MIMO transmission mode using non-codebook based precoding. With the first MIMO transmission mode, it may be able to obtain higher precoding gain, but channel reciprocity may be not desirable. Therefore, transmission of the first data using the first MIMO transmission mode may result in transmission failure. Optionally, when the first device performs retransmission of all or part of the first data, the second MIMO transmission mode, which is different from the first MIMO transmission mode, may be used to perform retransmission of all or part of the first data. For example, the second MIMO transmission mode may refer to a MIMO transmission mode using transmit diversity or a single antenna port, thereby obtaining more stable transmission performance and ensuring that the first data can be correctly transmitted through the retransmission.

In other words, different MIMO transmission modes may be used by the first device between an initial transmission of the first data and retransmission of the first data; or, when the first data needs to be retransmitted multiple times, different MIMO transmission modes may be used by the first device in the multiple retransmission of the first data.

It should be understood that the specific MIMO transmission modes corresponding to the first MIMO transmission mode and the second MIMO transmission mode are only examples instead of limitation. For example, the first MIMO transmission mode may also be the MIMO transmission mode using transmit diversity, and the second MIMO transmission mode may also be another MIMO transmission mode such as the MIMO transmission mode using non-codebook based precoding. For another example, the first MIMO transmission mode may be the MIMO transmission mode using a single antenna port, and the second MIMO transmission mode may be another MIMO transmission mode such as the MIMO transmission mode using transmit diversity.

Optionally, as an embodiment, the step S210 may include:
the first device sends the first data to the second device by using a first antenna port.

In this embodiment, the step S220 may include:
the first device performs retransmission of all or part of the first data by using a second antenna port, the second antenna port being different from the first antenna port.

Specifically, the first device may transmit the first data multiple times by using different antenna ports. For example, after transmitting the first data by using the first antenna port, the first device may use the second antenna port to perform retransmission of all or part of the first data. Optionally, the first antenna port may include at least one antenna port, and the second antenna port may also include at least one antenna port. The second antenna port being different from the first antenna port may refer to that, the at least one antenna port included in the first antenna port and the at least one antenna port included in the second antenna port are different in part or in whole.

Optionally, when the first device includes N antenna ports, for the k-th transmission of the first data, the first device may perform the transmission through an antenna port with an index number n, where N is an integer greater than 1, k is an integer greater than 0, $n=(k-1) \mod N$, that is, n is an integer being equal to k−1 modulo N. in an embodiment, different antenna ports may be formed by different beams, or precoded by using different precoding matrices, or may be mapped to different physical antennas.

Optionally, in an embodiment, the S210 step may include:
the first device sends the first data to the second device by using a first precoding matrix.

In this embodiment, the step S220 may include:
the first device performs retransmission of all or part of the first data by using a second precoding matrix, the second precoding matrix being different from the first precoding matrix.

Specifically, the first device may transmit the first data multiple times by using different precoding matrices. For example, after performing precoding on the first data by using the first precoding matrix, the first device performs transmission of the first data; after the transmission, the first device performs precoding on all or part of the first data by using the second precoding matrix different from the first precoding matrix, and then performs retransmission of all or part of the first data.

Optionally, the method 200 may further include:
the first device acquires, by using a cycling manner, a precoding matrix used for each transmission of all or part of the first data from a preconfigured precoding matrix set.

Specifically, the first device may acquire, by using a cycling manner, the precoding matrix used for each transmission of all or part of the first data from the preconfigured precoding matrix set. For example, the first device may store in advance the precoding matrix set including N precoding matrices, and for the k-th transmission of the first data, the first device may perform precoding on the first data by using the precoding matrix set with an index of m in the precoding matrix set, where N is an integer greater than 1, k is an integer greater than 0, $m=(k-1) \mod N$, that is, m is an integer being equal to by k−1 modulo N.

Optionally, in an embodiment, the step S210 may include:
the first device sends the first data to the second device by using a first number of transmission layer.

In this embodiment, the step S220 may include:
the first device performs retransmission of all or part of the first data by using a second number of transmission layer, the second number of transmission layer being different from the first number of transmission layer.

Specifically, the first device may transmit the first data multiple times by using different numbers of transmission layer. For example, when the first device transmits the first data by using the first number of transmission layer and the transmission fails, the first device may perform retransmission of all or part of the first data by using the second number of transmission layer different from the first number of transmission layer. For example, the first number of transmission layer is N, where N is an integer greater than 1; if the first device uses the first number of transmission layer to transmit the first data and the transmission fails, the first device may reduce the number of transmission layer to improve transmission reliability. For example, when N=2 and the transmission fails, the first device may use a single layer transmission mode with the number of transmission layer being 1, where half data of the first data is transmitted each time, thereby increasing reliability of data transmission.

Optionally, in an embodiment, the step S210 may include:
the first device sends the first data to the second device by using a first beam.

In this embodiment, the step S220 may include:
the first device performs retransmission of all or part of the first data by using a second beam, the second beam being different from the first beam.

Specifically, the first device may transmit the first data multiple times by using different beams. For example, after transmitting the first data by using the first beam, the first device may transmit all or part of the first data by using the second beam different from the first beam. It should be understood that the first beam may include at least one beam, and the second beam may also include at least one beam. The second beam being different from the first beam may refer to that, the at least one beam included in the first beam and the at least one beam included in the second beam are different in part or in whole. For example, the first device predetermines N beams (including beam 0 to beam N−1), where N is an integer greater than 1, and the N beams may be used by the first device for data transmission. When transmission of the first data performed by the first device using beam 0 fails, the first device may perform retransmission of all or part of the first data by using the beam among beam 1 to beam N−1, that is, the first device may use a beam in the N beams in rotation to perform transmission of the first data. For example, for the k-th transmission of the first data, the first device may transmit the first data by using a beam with an index of m among the N beams, where m=(k−1) mod N, that is, m is an integer equal to k−1 modulo N.

Optionally, in an embodiment, the step S210 may include:

the first device sends the first data to the second device by using a first transmission power;

In this embodiment, the step S220 may include:

the first device performs retransmission of all or part of the first data by using a second transmission power, the second transmission power being different from the first transmission power.

Specifically, the first device may transmit the first data multiple times by using different transmission powers. For example, when the first device transmits the first data for the first time, a lower transmission power may be used to save power. If this transmission of the first data fails, the first device may increase the transmission power to perform retransmission of all or part of the first data, thereby increasing the probability of successful retransmission. Optionally, each retransmission may use a higher transmission power than the previous transmission until the highest transmission power is reached. Optionally, an increment of the transmission power of the (k+1)-th transmission of the first data relative to the k-th transmission (which may be referred to as a power increase value, or a power step value) may be configured in advance by the network device for the first device. Optionally, the first device may also use a fixed power increase value or a fixed power step value.

It should be understood that the first device uses different transmission modes for initial transmission and retransmission of the first data. For example, different MIMO transmission modes, different antenna ports, different precoding matrices, different beams, or different transmission power may be used. In other words, at least one of the MIMO transmission mode, the antenna port, the precoding matrix, the beam, and the transmission power used for the initial transmission and retransmission of the first data is different.

It should also be understood that if the first device needs to transmit the first data multiple times, the transmission mode used for each retransmission of the first data may be different. For example, different MIMO transmission modes, different antenna ports, different precoding matrix, different beams, or different transmission power may be used. In other words, at least one of the MIMO transmission mode, the antenna port, the precoding matrix, the beam, and the transmission power used for the multiple times of retransmission of the first data is different.

Optionally, a transmission mode used by the first device for initial transmission or retransmission of the first data is pre-configured by the second device for the first device, or predetermined by the first device and the second device, or determined by the first device.

Optionally, in some embodiments, the method 200 may further include:

the first device determines a resource pool used for transmitting the first data according to a transmission mode used for transmitting the first data and a correspondence, the correspondence being indicative of corresponding relation between multiple transmission modes used for transmitting the first data and multiple resource pools.

Specifically, the first device may transmit the first data multiple times in different resource pools. In other words, the initial transmission and retransmission of the first data are transmitted in different resource pools. When multiple times of retransmission are needed, each retransmission may also be transmitted in different resource pools. Optionally, the multiple transmission modes used by the first device to transmit the first data may have a corresponding relation with the multiple resource pools. Accordingly, the first device may determine the resource pool for transmitting the first data according to the transmission mode used for transmitting the first data and the corresponding relation, so that the first device may transmit the first data in the resource pool. Optionally, the corresponding relation may include a correspondence between multiple MIMO transmission modes and multiple resource pools, a correspondence between multiple antenna ports and multiple resource pools, a correspondence between multiple transmission powers and multiple resource pools, or the like. Optionally, when detecting the first data in the resource pool, the second device may determine, according to the resource pool and the corresponding relation, a transmission mode used by the first device for data transmission, so as to receive the first data according to the determined transmission mode.

Optionally, in some embodiments, the method 200 may further include:

the first device determines a transmission mode used for transmitting the first data according to a resource pool used for transmitting the first data and a correspondence, the correspondence being indicative of corresponding relation between multiple transmission modes used for transmitting the first data and multiple resource pools.

Specifically, the resource pool used by the first device to transmit the first data may be pre-configured by the second device for the first device, and the first device may determine the transmission mode used for transmitting the first data according to the pre-configured resource pool and the correspondence between multiple transmission modes and multiple resource pools, so that the first data can be transmitted in the pre-configured resource pool by using the determined transmission mode.

Therefore, according to the method for transmitting data provided by embodiments of the present application, when the first device fails to transmit the first data by using the first transmission mode, the first device may perform retransmission of all or part of the first data by using the second transmission mode different from the first transmission mode, thereby improving transmission reliability of retransmission. Herein, the second transmission mode being different from the first transmission mode may refer to difference in at least one of the MIMO transmission mode, the antenna port, the precoding matrix, the beam, and the transmission power.

The method embodiment of the present application is described in detail above with reference to FIG. 2, and the device embodiment of the present application will be described in detail below with reference to FIG. 3 and FIG. 4. It should be understood that the device embodiment and the method embodiment correspond to each other, and a similar description may refer to method embodiments.

Figure 3:
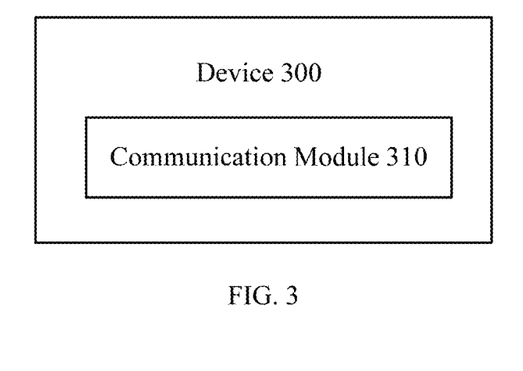
FIG. 3 is a schematic block diagram illustrating a device for transmitting data according to an embodiment of the present application.

FIG. 3 illustrates a schematic block diagram of a device 300 for transmitting data according to an embodiment of the present application. As shown in FIG. 3, the device 300 includes a communication module 310.

The communication module 310 is configured to send, using a first transmission mode, first data to a second device, the first data being autonomously sent by the device; and perform, using a second transmission mode, retransmission of all or part of the first data, the second transmission mode being different from the first transmission mode.

Optionally, the first data autonomously sent by the device is sent by the device without receiving a scheduling grant from another device.

Optionally, the communication module 310 is specifically configured to:

send, using a first multiple input multiple output (MIMO) transmission mode, the first data to the second device; and perform, using a second MIMO transmission mode, the retransmission of all or part of the first data, the second MIMO transmission mode being different from the first MIMO transmission mode.

Optionally, the communication module 310 is specifically configured to:

send, using a first antenna port, the first data to the second device; and perform, using a second antenna port, the retransmission of all or part of the first data, the second antenna port being different from the first antenna port.

Optionally, the communication module 310 is specifically configured to:

send, using a first precoding matrix, the first data to the second device; and perform, using a second precoding matrix, the retransmission of all or part of the first data, the second precoding matrix being different from the first precoding matrix.

Optionally, the device 300 may further include:

an acquiring module, configured to acquire, using a cycling manner, a precoding matrix used for each transmission of all or part of the first data from a preconfigured precoding matrix set.

Optionally, the communication module 310 is specifically configured to:

send, using a first number of transmission layer, the first data to the second device; and perform, using a second number of transmission layer, the retransmission of all or part of the first data, the second number of transmission layer being different from the first number of transmission layer.

Optionally, the communication module 310 is specifically configured to:

send, using a first beam, the first data to the second device; and perform, using a second beam, the retransmission of all or part of the first data, the second beam being different from the first beam.

Optionally, the communication module 310 is specifically configured to:

send, using a first transmission power, the first data to the second device; and perform, using a second transmission power, the retransmission of all or part of the first data, the second transmission power being different from the first transmission power.

Optionally, the communication module 310 is specifically configured to:

perform the retransmission of all or part of the first data when there is no scheduling grant or acknowledgment/negative-acknowledgement (ACK/NACK) indication being received from the second device after sending the first data to the second device.

Optionally, when the device performs retransmission of all or part of the first data for multiple times, different transmission modes are used for each time of the retransmission of all or part of the first data.

Optionally, a transmission mode used by the device for initial transmission or retransmission of the first data is pre-configured by the second device for the device, or predetermined by the device and the second device, or determined by the device.

Optionally, the device 300 further includes:

a first determining module, configured to determine a resource pool used for transmitting the first data according to a transmission mode used for transmitting the first data and a correspondence, the correspondence being indicative of corresponding relation between multiple transmission modes used for transmitting the first data and multiple resource pools.

Optionally, the device 300 further includes:

a second determining module, configured to determine a transmission mode used for transmitting the first data according to a resource pool used for transmitting the first data and a correspondence, the correspondence being indicative of corresponding relation between multiple transmission modes used for transmitting the first data and multiple resource pools.

Optionally, the device is a terminal device, and the second device is a network device; or the device is a terminal device, and the second device is a terminal device.

It should be understood that the device 300 according to the embodiment of the present application may correspond to the first device in the method embodiments of the present application, and the foregoing and other operations and/or functions of the respective units in the device 300 are respectively used for implementing corresponding process of the first device in the method 200 shown in FIG. 2 and are not repeated here for brevity.

Figure 4:
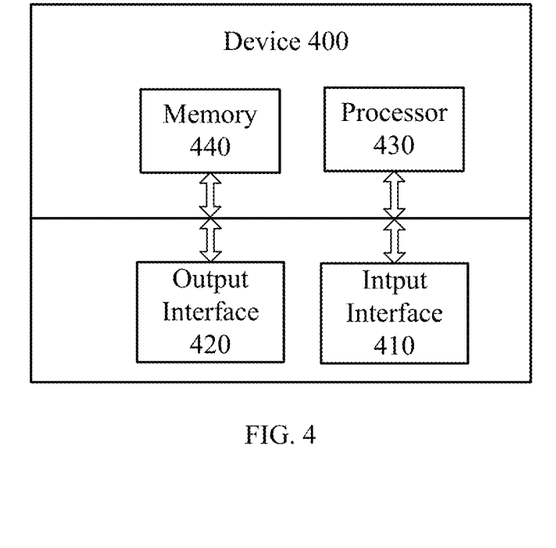
FIG. 4 is a schematic block diagram illustrating a device for transmitting data according to an embodiment of the present application.

As shown in FIG. 4, the embodiment of the present application further provides a device 400 for transmitting data, which may be the device 300 in FIG. 3 and may be used to execute the process corresponding to the first device in the method 200 of FIG. 2. The device 400 includes an input interface 410, an output interface 420, a processor 430, and a memory 440. The input interface 410, the output interface 420, the processor 430, and the memory 440 may be connected via a bus system. The memory 440 is used to store programs, instructions or codes. The processor 430 is configured to execute the program, instruction or code in the memory 440, so as to control the input interface 410 to receive signal, control the output interface 420 to send signal, and complete the operations in the foregoing method embodiments.

It should be understood that, in the embodiment of the present application, the processor 430 may be a central processing unit ("CPU"), and the processor 430 may also be other general-purpose processors, digital signal processors (DSPs), an application specific integrated circuit (ASIC), an off-the-shelf programmable gate array (FPGA) or other programmable logic device, discrete gate or transistor logic device, discrete hardware component, and the like. The general purpose processor may be a microprocessor or the processor or any conventional processor or the like.

The memory 440 may include read only memory and random access memory and provides instructions and data to the processor 430. A portion of the memory 440 may also include a non-volatile random access memory. For example, the memory 440 can also store information of the device type.

In the implementation process, respective content of the foregoing method may be completed by an integrated logic circuit of hardware in the processor 430 or an instruction in a form of software. The content of the method disclosed in the embodiments of the present application may be directly implemented as a hardware processor, or may be performed by a combination of hardware and software modules in the processor. The software module can be located in a conventional storage medium such as random access memory, flash memory, read only memory, programmable read only memory or electrically erasable programmable memory, registers, and the like. The storage medium is located in the memory 440, and the processor 430 reads the information in the memory 440 and combines its hardware to complete the contents of the above method. To avoid repetition, it will not be described in detail here.

In a specific implementation, the communication module 310 of FIG. 3 may be implemented by the input interface 410 and the output interface 420 of FIG. 4.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or integrated into another system, or some features may be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, which is essential or contributes to the prior art, or a part of the technical solution, may be embodied in the form of a software product, which is stored in a storage medium, including The instructions are used to cause a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like.

The foregoing is only a specific embodiment of the present application, but the scope of protection of the present application is not limited thereto, and any person skilled in the art can easily think of changes or substitutions within the technical scope disclosed in the present application. It should be covered by the scope of protection of this application. Therefore, the scope of protection of the present application should be determined by the scope of the claims.

What is claimed is:

1. A method for transmitting data, comprising:
sending, by a first device using a first transmission mode, first data to a second device, the first data being autonomously sent by the first device; and
performing, by the first device using a second transmission mode, retransmission of all or part of the first data when there is no acknowledgment (ACK) indication being received from the second device and there is no negative-acknowledgement (NACK) indication being received from the second device after sending the first data to the second device, wherein the second transmission mode is different from the first transmission mode;
wherein the sending, by a first device using a first transmission mode, first data to a second device comprises:
sending, by the first device using a first number of transmission layer, the first data to the second device, the first number of transmission layer being greater than 1;
the performing, by the first device using a second transmission mode, retransmission of all or part of the first data comprises:
performing, by the first device using a single layer transmission mode, the retransmission of all of the first data for multiple times, wherein part of the first data is transmitted each time.

2. The method according to claim 1, wherein the first data autonomously sent by the first device is sent by the first device without receiving a scheduling grant from another device.

3. The method according to claim 1, wherein the sending, by a first device using a first transmission mode, first data to a second device further comprises:
sending, by the first device using a first antenna port, the first data to the second device;
the performing, by the first device using a second transmission mode, retransmission of all or part of the first data further comprises:
performing, by the first device using a second antenna port, the retransmission of all or part of the first data, the second antenna port being different from the first antenna port.

4. The method according to claim 1, wherein the sending, by a first device using a first transmission mode, first data to a second device further comprises:
sending, by the first device using a first precoding matrix, the first data to the second device;
the performing, by the first device using a second transmission mode, retransmission of all or part of the first data further comprises:
performing, by the first device using a second precoding matrix, the retransmission of all or part of the first data, the second precoding matrix being different from the first precoding matrix.

5. The method according to claim 4, wherein the method further comprises:

acquiring, by the first device using a cycling manner, a precoding matrix used for each transmission of all or part of the first data from a preconfigured precoding matrix set.

6. The method according to claim 1, wherein the sending, by a first device using a first transmission mode, first data to a second device further comprises:
sending, by the first device using a first beam, the first data to the second device;
the performing, by the first device using a second transmission mode, retransmission of all or part of the first data further comprises:
performing, by the first device using a second beam, the retransmission of all or part of the first data, the second beam being different from the first beam.

7. The method according to claim 1, wherein the sending, by a first device using a first transmission mode, first data to a second device further comprises:
sending, by the first device using a first transmission power, the first data to the second device;
the performing, by the first device using a second transmission mode, retransmission of all or part of the first data further comprises:
performing, by the first device using a second transmission power, the retransmission of all or part of the first data, the second transmission power being different from the first transmission power.

8. The method according to claim 1, wherein the performing, by the first device using a second transmission mode, retransmission of all or part of the first data further comprises:
performing, by the first device, the retransmission of all or part of the first data when there is no scheduling grant or acknowledgment/negative-acknowledgement (ACK/NACK) indication being received from the second device after sending the first data to the second device.

9. The method according to claim 1, wherein a transmission mode used by the first device for initial transmission or retransmission of the first data is pre-configured by the second device for the first device, or predetermined by the first device and the second device, or determined by the first device.

10. A device for transmitting data, comprising:
a memory, a processor and a transceiver, the memory being configured to store a program;
wherein the processor is configured to execute the program and, when the program is executed, implement a method for transmitting data based on the transceiver, the method comprising:
sending, using a first transmission mode, first data to a second device, the first data being autonomously sent by the device; and
performing, using a second transmission mode, retransmission of all or part of the first data when there is no acknowledgment (ACK) indication being received from the second device and there is no negative-acknowledgement (NACK) indication being received from the second device after sending the first data to the second device, wherein the second transmission mode is different from the first transmission mode;
wherein the sending, by a first device using a first transmission mode, first data to a second device comprises:
sending, by the first device using a first number of transmission layer, the first data to the second device, the first number of transmission layer being greater than 1;
the performing, by the first device using a second transmission mode, retransmission of all or part of the first data comprises:
performing, by the first device using a single layer transmission mode, the retransmission of all of the first data for multiple times, wherein part of the first data is transmitted each time.

11. The device according to claim 10, wherein the first data autonomously sent by the device is sent by the device without receiving a scheduling grant from another device.

12. The device according to claim 10, wherein the sending, using a first transmission mode, first data to a second device further comprises:
sending, using a first antenna port, the first data to the second device;
the performing, using a second transmission mode, retransmission of all or part of the first data further comprises:
performing, using a second antenna port, the retransmission of all or part of the first data, the second antenna port being different from the first antenna port.

13. The device according to claim 10, wherein the sending, using a first transmission mode, first data to a second device further comprises:
sending, using a first precoding matrix, the first data to the second device;
the performing, using a second transmission mode, retransmission of all or part of the first data further comprises:
performing, using a second precoding matrix, the retransmission of all or part of the first data, the second precoding matrix being different from the first precoding matrix.

14. The device according to claim 13, wherein the method further comprises:
acquiring, using a cycling manner, a precoding matrix used for each transmission of all or part of the first data from a preconfigured precoding matrix set.

15. The device according to claim 10, wherein the sending, using a first transmission mode, first data to a second device further comprises:
sending, using a first beam, the first data to the second device;
the performing, using a second transmission mode, retransmission of all or part of the first data further comprises:
performing, using a second beam, the retransmission of all or part of the first data, the second beam being different from the first beam.

16. The device according to claim 10, wherein the sending, using a first transmission mode, first data to a second device further comprises:
sending, using a first transmission power, the first data to the second device;
the performing, using a second transmission mode, retransmission of all or part of the first data further comprises:
performing, using a second transmission power, the retransmission of all or part of the first data, the second transmission power being different from the first transmission power.

17. The device according to claim 10, wherein the performing, using a second transmission mode, retransmission of all or part of the first data further comprises:
performing the retransmission of all or part of the first data when there is no scheduling grant or acknowledgment/negative-acknowledgement (ACK/NACK) indication being received from the second device after sending the first data to the second device.

18. The device according to claim 10, wherein a transmission mode used by the device for initial transmission or retransmission of the first data is pre-configured by the second device for the device, or predetermined by the device and the second device, or determined by the device.

\* \* \* \* \*